No. 722,936. PATENTED MAR. 17, 1903.
C. E. BARRY.
ELECTRIC BRAKE SYSTEM.
APPLICATION FILED NOV. 6, 1900. RENEWED AUG. 9, 1901.
NO MODEL.
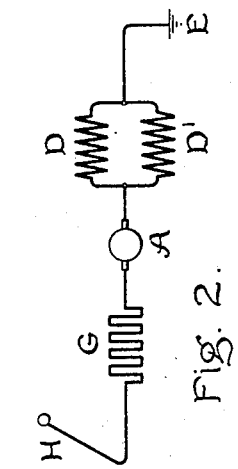
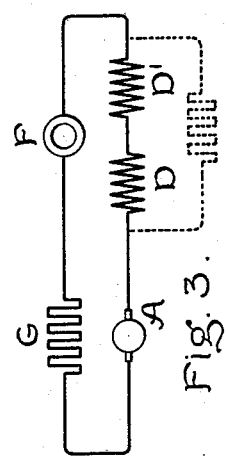
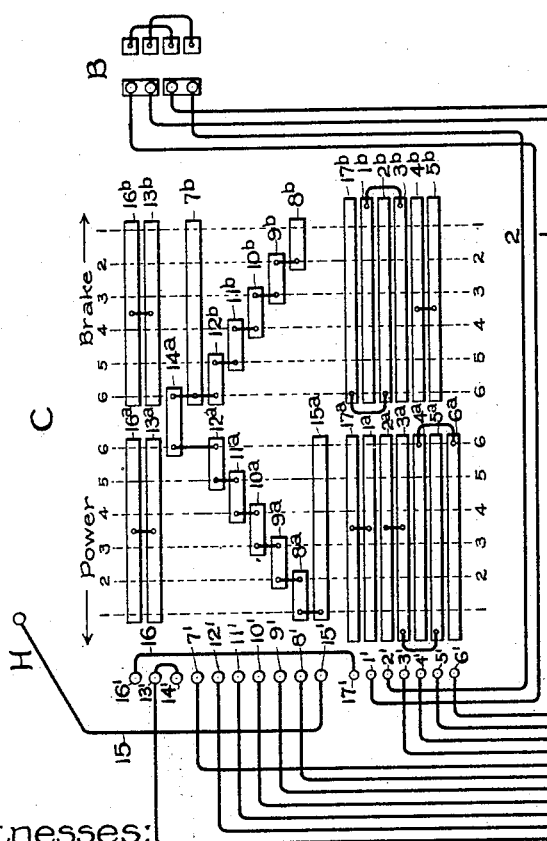
Witnesses:
Lewis B. Abell.
Benjamin B. Hull.
Inventor.
Charles E. Barry
by Albert G. Davis
Atty.
THE NORRIS PETERS CO., PHOTO-LITHO., WASHINGTON, D. C.

UNITED STATES PATENT OFFICE.

CHARLES E. BARRY, OF SCHENECTADY, NEW YORK, ASSIGNOR TO GENERAL ELECTRIC COMPANY, A CORPORATION OF NEW YORK.

ELECTRIC-BRAKE SYSTEM.

SPECIFICATION forming part of Letters Patent No. 722,936, dated March 17, 1903.

Application filed November 6, 1900. Renewed August 9, 1901. Serial No. 71,530. (No model.)

*To all whom it may concern:*

Be it known that I, CHARLES E. BARRY, a citizen of the United States, residing at Schenectady, county of Schenectady, State of New York, have invented certain new and useful Improvements in Electric-Brake Systems, (Case No. 1,409,) of which the following is a specification.

My invention relates to electric brakes for railway-cars, and especially to that class in which the car-motor is used as a braking-generator.

In the series motor commonly used for railway-work it is desirable to have a field of low magnetic density—that is, an unsaturated field—in order to facilitate the regulation of the motor, because an unsaturated field will alter its density quickly when a change is effected in the resistance of the circuit, and thus the torque of the motor can be more easily varied and regulated than would be the case if the field were saturated. Furthermore, the heating effect is less and the energy consumed is less, and the motor is therefore more efficient; but, on the other hand, in a generator it is desirable to have a saturated field in order that the output may be as large and as steady as possible irrespective of changes in the speed within certain limits. The latter condition is of especial importance in electric braking, because it is very desirable to have a uniform maximum braking-current at the command of the motorman, whether his car is running at full speed or only at half speed. With such a maximum braking-current he can make an emergency stop even at half speed, while for ordinary service stops he can easily moderate the braking-current by throwing in the resistance. Since this uniform maximum current can only be obtained from a generator with a saturated field, as above set forth, it is very desirable that some way be provided by which the field density of the car-motor can be altered from an unsaturated condition for power to a saturated condition for braking.

The object of my invention is to enable this requirement to be met, so that the same machine will serve as an efficient and easily-controllable motor and yet furnish a maximum unvarying braking-current at various speeds between full speed and, say, about half speed. To this end I provide the motor with a subdivided field-winding, and I so connect this winding to the contacts of a suitable controlling-switch that it will normally produce a field of comparatively low magnetic density when the motor is being used for propulsion, while for braking the connections will be so changed that the effective number of turns in the field-winding will be increased so as to produce a saturated field.

In the specific arrangement which I have illustrated in this application I make use of a series motor provided with a plurality of field-windings, and I so arrange the connections that when the machine is used as a motor a plurality of field-windings will be connected in parallel, but when used as a generator in series. This insures a low field density in the first case, where each coil gets only its proportionate share of the current, while in the second case all the field-coils get all the current, and hence are of a correspondingly stronger magnetism, assuming that the current is the same in both instances. This enables the motor running as a generator to produce a strong current even at comparatively low speeds, and hence gives a more satisfactory and uniform action of the brakes and enables the brakes to operate better at slower speeds than are now possible.

In the accompanying drawings, which illustrate one system of circuits for carrying out my invention, Figure 1 is a general diagram of the system. Fig. 2 shows the arrangement when the machine is running as a motor, and Fig. 3 the arrangement when running as a generator to supply a braking-current.

The motor is shown as provided with two field-coils; but it is evident that any number of poles may be used. The armature A is connected by the leads 1 2 through the usual reversing-switch B with the contact-fingers 1' 2' in the controller C. One field-coil D is connected by leads 3 4 with the fingers 3' 4', and the coil D' has one terminal connected by lead 5 with the finger 5' and the other terminal with the ground E. A finger 6' is also grounded through lead 6. If a brake-magnet F is used, it has one terminal connected by lead 7 with the finger 7' and the other terminal grounded. A resistance G has its several coils connected by leads 8 9 10 11 12 13 with the fingers 8' 9' 10' 11' 12' 13' 14'. The trolley H is connected by lead 15 with the finger 15'. Two fingers 16' and 17' are connected by a lead 16.

The controller-shaft carries a set of segments to make the proper connections between the fingers to operate the machine first as a motor having its coils connected in series multiple with the trolley and ground through the resistances, the latter being successively cut out as the controller is rotated to its successive power positions, then as a generator furnishing a braking-current on a closed circuit having all the field-coils in series with the resistance-coils, which can be cut in or out to vary the retarding effect, as circumstances may require. A more detailed description of this portion of the apparatus will now be given. The controller-cylinder carries parallel segments $1^a$, $2^a$, $3^a$, $4^a$, $5^a$, $6^a$, $13^a$, $15^a$, $16^a$, and $17^a$, each common to all six positions for power. Segment $6^a$ is connected with $4^a$, segment $5^a$ with $3^a$, segment $3^a$ with $2^a$, segment $1^a$ with $17^a$, and segment $13^a$ with $16^a$. Short overlapping segments $8^a$, $9^a$, $10^a$, $11^a$, and $12^a$ correspond with the several power positions at different levels on the cylinder. They are all connected with each other and with the segment $15^a$. The cylinder also carries parallel segments $1^b$, $2^b$, $3^b$, $4^b$, $5^b$, $7^b$, $13^b$, $16^b$, and $17^b$, each common to all the six positions for braking. Segments $5^b$ and $4^b$ are connected, as are also segments $3^b$ and $1^b$, segments $2^b$ and $17^b$, and segments $13^b$ and $16^b$. Short overlapping segments $8^b$, $9^b$, $10^b$, $11^b$, and $12^b$ correspond with the several braking positions of the controller. They are all connected with each other and with segment $7^b$. A short segment $14^a$ is connected with segments $12^a$ and $12^b$. The several segments in each set coact with the fingers having the same numerals. In the first power position the circuit is from trolley H to finger 15', segment $15^a$, segment $8^a$, finger 8', all the resistance-coils, finger 13', segments $13^a$ $16^a$, fingers 16' 17', segments $17^a$ $1^a$, finger 1', reversing-switch B, armature A, finger 2', segments $2^a$ to $3^a$ and $5^a$ in parallel, through leads 3 and 5 to the coils D D', from coil D by the lead 4 to finger 4', segments $4^a$ and $6^a$ to finger 6', and thence by lead 6 to ground, and through coil D' to ground.

During the rotation of the controller-cylinder through the six power positions the circuit remains the same, except that successive coils of the resistance are cut out, until in the sixth position none of the coils are in circuit. In order to connect the motor to operate as a braking-generator, the controller-cylinder is turned back to its off position and through the off position to the braking position, (numbered 1 in Fig. 1.) The circuit is then from one brush of the armature A by lead 1, through the reversing-switch B to finger 1', segments $1^b$ $3^b$, finger 3', coil D, finger 4', segments $4^b$ $5^b$, finger 5', coil D', brake F, finger 7', segments $7^b$ and $8^b$, finger 8', resistance G, finger 13', segments $13^b$ and $16^b$, fingers 16' and 17', segments $17^b$ and $2^b$, finger 2', lead 2, and reversing-switch B to the other brush of the armature A. As the rotation of the controller-cylinder is continued the several coils of the resistance G are cut out successively, the other parts of the circuit remaining unaltered.

If the motor is so wound that in any given instance excessive heating would result from connecting the field-coils in series, a fixed resistance may be put in a shunt around the field-coils in order to reduce their density. The shunt would be arranged to be open-circuited when the controller is shifted from braking to power. The value of the resistance would be determined in each case according to the conditions to be considered. Such a shunt is indicated in dotted lines in Fig. 3.

For the sake of simplicity I have shown and described my invention as applied to a single motor. In practice two or more motors are frequently used on one car, and I wish it understood that I may equally well control all of them to produce a result similar to the one hereinbefore set forth. When two or more motors are used for braking, the field-coils of each motor may be connected in series, the motors being in multiple, or the field-coils of both motors may be all connected in series, the armatures being in multiple.

Evidently many changes in form may be made in applying the improvements herein described to a braking system, and in the claims hereto appended I aim to cover all modifications which embody the essence of my invention.

What I claim as new, and desire to secure by Letters Patent of the United States, is—

1. In combination, a dynamo-electric machine provided with a subdivided series field-winding, and a controlling device comprising contacts for connecting the windings of said dynamo-electric machine so that it may operate either as a propelling-motor or as a braking-generator; the said contacts being arranged to so connect the field-winding as to produce a field of comparatively low magnetic density when the machine is operated as a motor, and to increase the effective number of turns in the field-winding so as to produce a saturated field when the machine begins to operate as a braking-generator.

2. A series motor having a subdivided field-winding, in combination with a controller comprising power and brake switches, contacts on the power-switch for connecting the field-winding to normally produce a field of comparatively low magnetic density, and contacts on the brake-switch for increasing the effective number of turns in the field-winding so as to produce a saturated field for braking.

3. The combination with a series-wound dynamo-electric machine provided with a subdivided field-winding, of means for connecting said winding in circuit so as to produce a field of comparatively low magnetic density when the machine is operated as a motor, and for changing the connections so as to increase the effective number of turns in the field-winding so as to produce a saturated field when the machine begins to operate as a braking-generator.

4. The combination with a series motor having a plurality of field-coils normally connected in parallel, of means for connecting the motor-coils in series in a closed circuit to produce a braking-current.

5. The combination with a series motor provided with a plurality of field-coils, of means for connecting the field-coils of the motor in parallel when the machine operates as a motor, and in series when it acts as a braking-generator.

6. The combination with a series motor provided with a plurality of field-coils, of a resistance, and a controller provided with contact-fingers and segments to throw the field-coils of the motor in series multiple with the resistance when the machine operates as a motor, and all in series with the resistance when operating as a braking-generator.

7. The combination with a motor having a plurality of field-coils normally connected in parallel, of an electromagnetic brake, and means for connecting said field-coils in series with each other and with the actuating-coil of said electromagnetic brake in a closed circuit to produce a braking effect.

8. The combination with a series motor provided with a plurality of field-coils, of an electromagnetic brake, means for connecting the field-coils of the motor in parallel when the machine operates as a motor, and means for connecting said coils in series in a closed circuit containing said electromagnetic brake when the motor acts as a generator.

9. The combination with a series motor provided with a plurality of field-coils, of a resistance, an electromagnetic brake, and a controller provided with contact-fingers and segments to throw the field-coils of the motor in series multiple with the resistance when the machine operates as a motor, and all in series with the resistance and the actuating-coil of said electromagnetic brake when operating as a braking-generator.

In witness whereof I have hereunto set my hand this 5th day of November, 1900.

CHARLES E. BARRY.

Witnesses:
BENJAMIN B. HULL,
MARGARET E. WOOLLEY.